(No Model.)
J. A. KENNEDY-McGREGOR.
CASTER WHEEL.
No. 557,597. Patented Apr. 7, 1896.
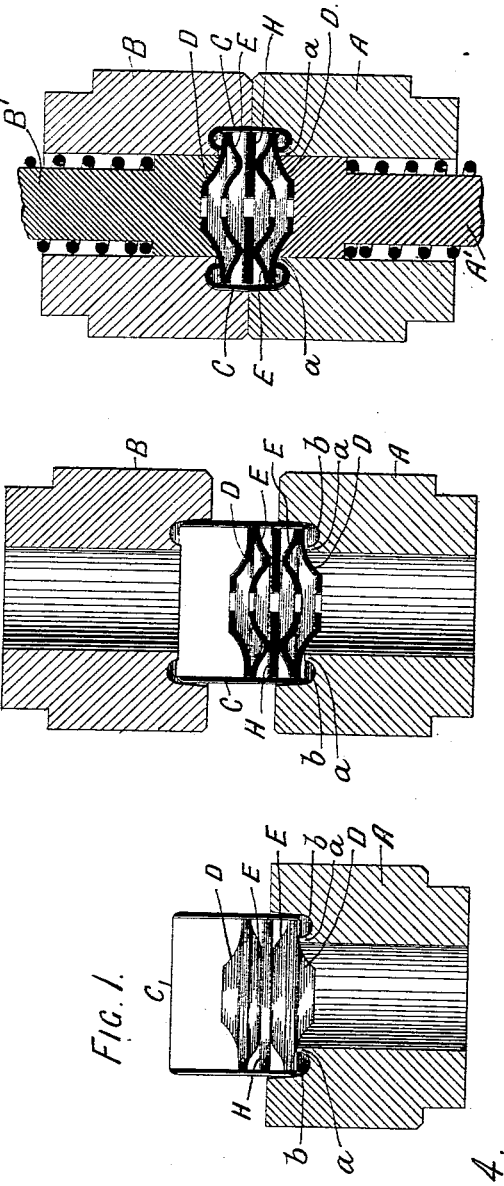
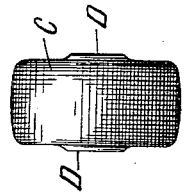
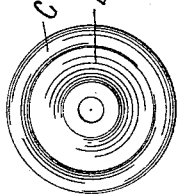
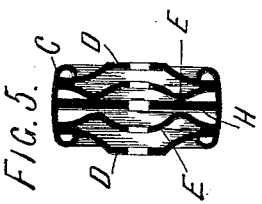
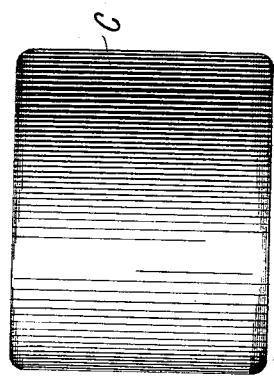

UNITED STATES PATENT OFFICE.

JOHN A. KENNEDY-McGREGOR, OF CHICAGO, ILLINOIS.

CASTER-WHEEL.

SPECIFICATION forming part of Letters Patent No. 557,597, dated April 7, 1896.

Application filed July 3, 1895. Serial No. 554,805. (No model.)

*To all whom it may concern:*

Be it known that I, JOHN ALEXANDER KENNEDY-McGREGOR, electrical engineer, of 1409 Manhattan building, Dearborn street, Chicago, Illinois, have invented certain new and useful Improvements in Caster or other Wheels, of which the following is a specification.

In the accompanying drawings, Figure 1 is a section of a bottom die with the pieces to form the wheel in position. Fig. 2 shows in section the position of the top die just before pressure is applied. Fig. 3 shows in section the top die closed down and the position of the dies after pressure has been applied. Fig. 4 shows on an enlarged scale the piece of tube as prepared for the die. Fig. 5 is a cross-section of a finished wheel. Fig. 6 is a side view, and Fig. 7 an edge view, of the same.

The present invention has reference to the manufacture of wheels suitable for casters and driving-pulleys, which I propose to make by inclosing a number of stamped disks or plates within a ring formed by cutting off a portion from a metal tube of suitable dimensions. In this form of wheel the disks, which are corrugated, are assembled together to constitute the body of the wheel within the ring, the edges of which are turned completely over to catch and grip the edges of the disks.

According to the present invention I am able to secure together the parts once assembled and finish the wheel perfectly at a single operation and without any repeated manipulation.

To form the wheel, the set of disks previously stamped to the proper shape is inclosed within a rim prepared from a short length of metal tube, and the parts thus assembled are placed in a die of special form composed of two parts, each the counterpart of the other. On pressure being applied the ends of the tube are both at the same time turned completely inward and caused to tightly grip the disks and hold them firmly together.

A represents the lower die, and B the upper die, which are counterparts of one another.

A' and B' are spring-plungers within the dies A and B, which serve to hold the disks during pressing and to eject the wheel from the die when finished.

At the bottom of the acting portion $a$ of each die is a rounded annular recess $b$, which annular recess is instrumental in effecting the perfect finish of the wheel above referred to.

C is the piece of tube, say brass, which is to form the rim of the wheel. The outer edges of this piece of tube are, as will be seen in the enlarged view, Fig. 4, slightly rounded or beveled off for the purpose to be presently explained.

D are external or face disks, preferably of brass, which are stamped out of sheet metal in the shape shown, or in any other convenient shape that will give an extended bearing for the axle-pin.

E are internal or supporting disks, which are stamped out of (preferably) sheet-steel in the corrugated or dish shape shown, or other convenient shape, which will give the thickness to the wheel, and also form a support to hold up the face-disks and form a resistance to the ends of the tube when they are turned inward on pressure being applied. The outward splay of these disks should be slightly greater than the width of the wheel, so that the rim, when curled inward, will close in upon and force them inward and together, so that they will be tightly gripped and there will be no rattling of the parts.

H is a strengthening-disk for the rim of the wheel, and is only necessary in wheels of comparatively large diameter. Each disk is pierced with a central hole to receive the axle of the wheel, or it may be a steel bush.

The parts having been thus prepared the tube C containing the disks D, E, and H, arranged in the order shown, is dropped into the die A, as indicated in Figs. 1 and 2. The top die B is then brought down to inclose the upper portion of the tube, which extends above the die A, as shown in Fig. 2. Pressure is next applied to the dies, which are thereby closed up to the position shown at Fig. 3. The effect of the pressure is to cause the ends of the tube to curl round in the annular recesses $b$ in both dies, (the rounded or beveled edges of the tube serving to lead this movement,) and to close onto the outside disks, which are thus nipped firmly between the turned-in ends of the tubular rim, thus producing, in an economical and simple manner, a strong rigid wheel.

Wheels thus formed are completely finished when they leave the dies and require no further manipulation.

What I claim is—

1. A wheel consisting of a set of corrugated disks forming the body of the wheel and a circumferential ring or tread having the edges at both ends turned inward and curled over so as to grip and press together the disks forming the body of the wheel, substantially as described.

2. A wheel consisting of a body including a pair of corrugated disks having their edges flared outwardly, and a pair of outer disks resting against the outwardly-flared edges of the inner disks, and a circumferential ring or tread having the edges at both ends turned inward and curled over so as to grip and press together the disks forming the body of the wheel, substantially as described.

3. A wheel consisting of a tread composed of a length of tube which is longer than the width or thickness of the wheel, two centrally-perforated dish-shaped disks having their centers raised to about the height of the edges placed within the tube with their edges outward, and two centrally-perforated dish-shaped disks placed outside the other disks with their edges inward, the said disks being held in position by the edges of the tube being curled round inwardly to press upon the outer disks and force all the disks together, substantially as described.

4. A wheel consisting of a tread composed of a length of tube which is longer than the width or thickness of the wheel, a flat centrally-perforated disk, two centrally-perforated dish-shaped disks having their centers raised to about the height of the edges placed within the tube one on either side of the flat disk and with their edges outward, and two centrally-perforated dish-shaped disks placed outside the other disks with their edges inward, the said disks being held in position by the edges of the tube being curled round inwardly to press upon the outer disks and force all the disks together, substantially as described.

JOHN A. KENNEDY-McGREGOR.

Witnesses:
H. K. WHITE,
H. F. C. GOLTZ.